Jan. 21, 1964  P. T. MARESCA  3,119,107
ONE WAY RADIO BEACON LOCATING SYSTEM
Filed Jan. 31, 1962
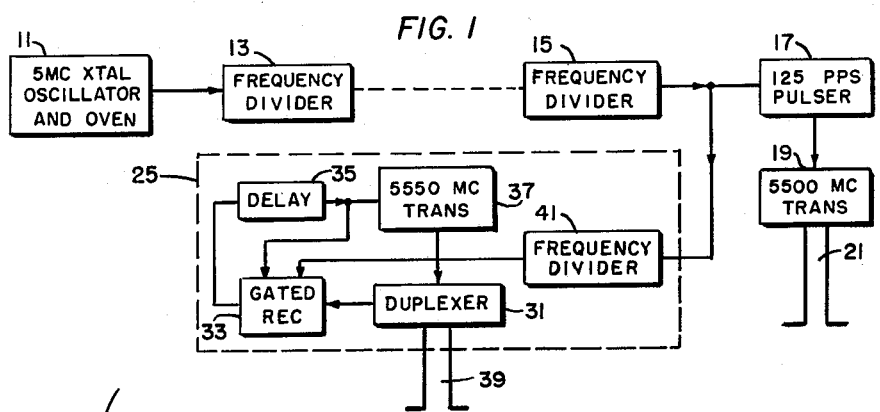
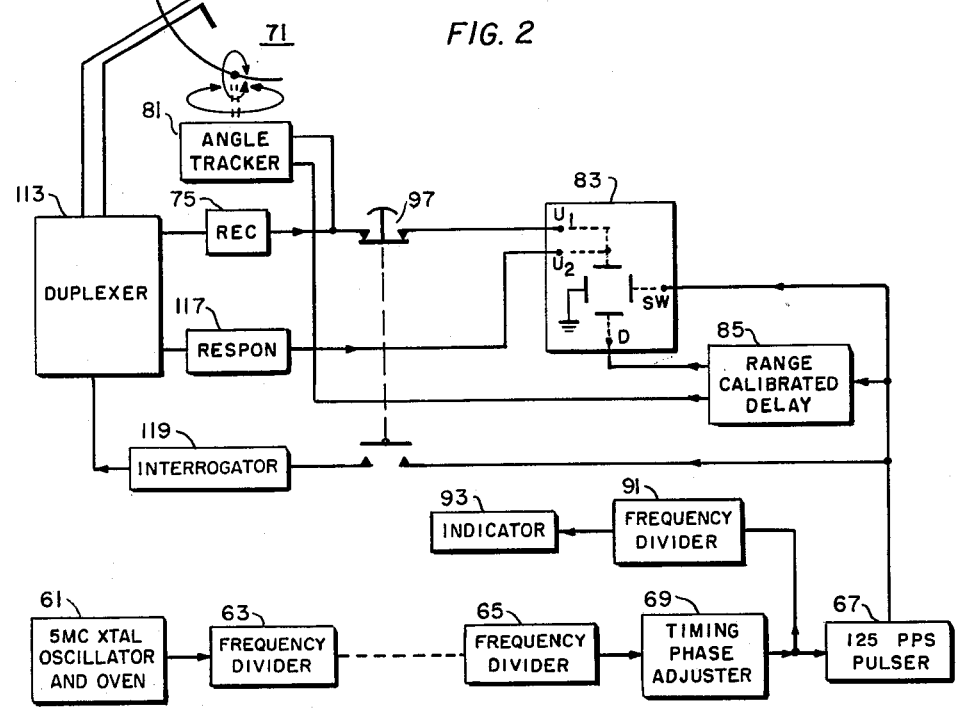
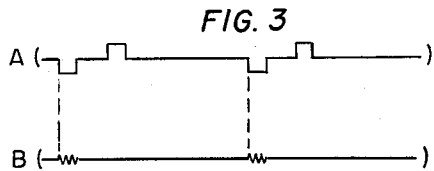
INVENTOR,
PETER T. MARESCA.
BY Jack H Linscott
ATTORNEY

3,119,107
ONE WAY RADIO BEACON LOCATING SYSTEM
Peter T. Maresca, Elberon Park, N.J., assignor to the United States of America as represented by the Secretary of the Army
Filed Jan. 31, 1962, Ser. No. 170,288
1 Claim. (Cl. 343—112)
(Granted under Title 35 U.S. Code (1952), sec. 266)

The invention described herein may be manufactured and used by or for the Government for governmental purposes without the payment of any royalty thereon.

Radar stations are used for range and angle tracking to locate, in terms of the (spherical) polar coordinates relative to the tracking station, any reflecting objects including enemy craft as potential targets, neutrals, or friendly defensive forces. The data is usually converted to a standardized coordinate system involving altitude and either conventional spherical coordinates (latitude and longitude) as used for navigation, or substantially rectangular grid coordinates as used on many maps. Such stations require very high levels of transmitted energy, increasing with the fourth power of the range, in order for the very small proportion of the energy reaching and reflected from the object, decreasing as the square of the distance, and similarly decreasing proportion of the reflected energy reaching the station to be distinguishable over other natural or man-made energy arriving at the station. When a friendly object can be equipped with "corner" reflectors, involving three mutually perpendicular reflecting planes as in Hopper Patent No. 3,010,103, for more efficient reflection the required transmitted energy level may be somewhat reduced (or range increased). When equipped with an actual receiver and re-transmitter, often known as a beacon or transponder station for "beacon-tracking" instead of relying on mere surface reflection for "skin-tracking," the energy levels at both stations can be very low, increasing merely with square of range. (See applicant's article, "The Microwave Radar Beacon Pinpoints Missiles in Flight" in Army Information Digest, November, 1955, p. 44–45).

Any transmitted or even reflected energy, particularly at high amplitude, tends to reveal the presence of the station, and to impose more interference on other systems, besides the cost of equipment and operation to produce such energy. Under military conditions revealing the presence of each station may involve actual direct danger to such station, since it provides an excellent source of energy for enemy homing missiles. Revealing the presence will also particularly aid an enemy in overcoming effectiveness of the system by supplying interfering or jamming energy to actuate either station improperly, thus obscuring the data or even preventing operation of the beacon by the tracking station. Even unintentional man-made or natural energy may sometimes actuate the beacon in a similar manner, particularly if made highly sensitive for very long distance operation. Furthermore, the inherent delay involved in operation of a beacon varies according to amplitude of the signal it receives; therefore even the range indicated by a beacon system is not entirely accurate. In the case of skin-tracking, and to a much lesser extent in the case of beacon tracking, the interrogation energy illuminatiang other objects may also be used by an enemy even if the original radiation is overlooked. The purpose of the present invention is to avoid any transmitted energy from the friendly tracking station and thus limit energy to the low level transmitted from the beacon at the object being located and also minimize improper beacon operation.

In radar stations, even with beacons, the range tracking is based on the entire "echo" time to and from the object, allowing for any delay due to beacon characteristics. However, in accordance with the present invention by actually synchronizing on a common time base the operation of the tracking station and the beacon on the object being located it is possible to determine the range by the one-way transmission time from the object to the tracking station. Such synchronizing requires highly accurate timing at both locations since at the very high velocity of radio wave propagation a small error in timing may represent a considerable error in range measurement. It is apparent that timing errors would not affect the accuracy of angle tracking that the Doppler effect would merely vary the apparent pulse carrier frequency and not the angle or range tracking accuracy.

For still greater accuracy in range tracking, particularly under long sustained operation, an occasional checking of the timing may be accomplished by transmission from the tracking station for the conventional transponder beacon mode of operation; the merely occasional need for such checking and the continued accurate directional tracking, to permit checking with minimum energy each time, substantially eliminates the chance of revealing the presence of the tracking station. In the following description, the term "beacon" will be used in a broad sense to indicate a station at the object being located including either accurate timing according to this invention, or the prior conventional transponder beacon to return a signal originated by the tracking station, and the term "transponder" will be used for only the latter type.

It is possible to locate a source of energy, even without precise information as to the timing of such source, if several widely spaced receiver stations giving very precise data as to direction and/or time of arrival can be properly coordinated. However, the high precision needed, inherent propagation errors, the original survey of the stations, the transmission of the data to a central point, and particularly the effective coordination of the data by such techniques as triangulation all involve very substantial problems. The techniques are useful mainly in relation to energy from such sources as enemy equipment, lightning, etc. On the other hand, the present invention has all the advantages of a single tracking station as in ordinary radar skin-tracking or beacon-tracking without requiring radiation from such station.

This invention involves a system for radio tracking a cooperating aerial target such as a missile in (spherical) polar coordinates, to a high accuracy, by a single station installed at a ground location. This single ground station performs the slant range and angle tracking essential to a complete determination of location without the necessity of transmitting energy as in conventional radar. The advantages are that:

(a) Since there is no transmission from the ground station, radio interference produced by a high power transmission is obviated.

(b) The entire tracking is performed at a single station; the physical location is not critical, the only requirement being that radio line of sight to the aerial vehicle must be maintained during the tracking function.

(c) Since the cooperating beacon in the aerial target is a transmitting device and does not contain a receiving system, the beacon is virtually jam or interference proof, as interference signals cannot enter the output signal produced by the beacon. This advantage is considered very significant.

(d) Since the signal received by the ground station is relatively free of spurious signals caused by interference and the usual effects of reradiated energy or multiple reflection introduced by the usual interrogating transmitter illuminating wide areas, detection and processing of the beacon signal by authorized users is simplified.

(e) Since the ground station does not radiate energy, detection of the station by enemy interception equipment is greatly reduced. Also, the station cannot offer an attractive target to destructive enemy homing missiles which are set to seek certain radio frequency radiation and then guide themselves to the source of the radiation.

(f) Since the beacon in the aerial target does not depend upon received signal or interrogation for its proper operation, the usual problems associated with beacon delay stability caused by the wide dynamic range of operation resulting from the shortest to the longest range of operation, are eliminated. The beacon produces a constant power output of the minimum level consistent with the maximum slant range of operation and the receiving sensitivity of the cooperating ground station.

The fundamental operation of the system is briefly described as follows: The radio beacon is designed for operation at some convenient radio frequency and for reference purposes will be assumed to be 5500 mcs. The output power of the beacon will be set to a level which will provide sufficient signal to noise ratio when received at the cooperating ground station and at the maximum slant range of operation. The output of the beacon will consist of a pulse modulation at a fixed highly stable repetition rate, controlled by a crystal oscillator timing source having an inherent stability of one part in $10^9$. The output of the beacon is radiated by a suitable antenna for transmission to the ground station.

The cooperating ground station (tracker) consists of a directional, steerable tracking antenna, a suitable receiving system and a display and ranging system. An identical crystal oscillator timing source as contained in the beacon is used to provide the timing reference for the ranging unit and therefore the range measurement. It will be noted that the absolute frequency of these two crystal oscillators is not as important to the proper functioning of the system, as is the frequency and phase stability of the two oscillators relative to each other.

The required stability is now readily attainable by apparatus suitable for such uses, as identified below. The probable error within any one cycle would be entirely negligible, including both the "jitter" error not carried forward to the next cycle and the actual error in frequency stability expressed as $10^{-9}$ indicating a frequency precise to 9 decimal places. Assuming the worst conditions this actual error in each cycle is added to the error in previous cycles to provide a cumulative error; since the error may be either positive or negative it may average slightly less than $10^{-9}$, but probably not less than $0.5 \times 10^{-9}$. However, the system as here considered involves possible error at two stations, so overall average error could be assumed as $10^{-9}$. A slightly more precise frequency source might be justified at the tracking station, where weight and expendability are less significant. A period of 30 minutes corresponds to $1.8 \times 10^9$ microseconds during which time error might be expected to reach ±1.8 microseconds; at 0.186 mile per microsecond as the rate of radiant energy travel this would represent .3348 mile, a rather small error considering the probable magnitude of measurements. The occasional beacon mode of operation provides for actual measurement of the error, thus permitting recalibration for even greater accuracy or unlimited periods of operation. Analyzing from the standpoint of the error accumulated in each cycle it is necessary to assume some pulse repetition rate such as 125 p./s. suited to an unambiguous range of over 1000 miles ($1.76 \times 10^6$ yards). At such range the error would be only $1.76 \times 10^{-3}$ yards, or for the entire cycle only $2.6 \times 10^{-3}$ yards. However, this would be cumulative to reach .325 yard per second or again only .3348 mile per 30 minutes. This absolute error is not actually affected by the range or pulse period. However, with a short range the percentage error might be fairly high. Ordinarily the pulse period would be determined by the expected range to be measured; therefore, in a very general sense the probable percentage error is roughly proportional to the number of pulse periods.

In common early radar the transmitted energy had involved very brief pulses of very high amplitude and of substantially a single frequency, requiring transmitting apparatus of corresponding peak rating, and echoes were received in the comparatively long intervals between pulses. The brevity of the pulse necessarily involved certain sideband frequencies of minor importance. Many variations from the pulse technique are known in which the energy is spread over a longer time, through a wider frequency band, or usually both. For example, in FM radar the carrier varies gradually with time, usually at a uniform sawtooth rate; therefore reflected signal produces a beat note with the transmitted signal of a frequency proportional to the range over corresponding portions of the sawtooth. In correlation radar the variation is far more complex and reflected signal is compared with various intentionally delayed versions of the original, giving a coincidence indication when intentional delay corresponds to the actual propagation delay involved in reflection. Such techniques usually spread the energy to much longer pulses of wider frequency band requiring apparatus of lesser rating, some components of echoes being received while other components are transmitted. The pulse characteristic may become entirely obscured and the energy may even become a continuous (but not uniform or continuous-wave) signal if its nature allows for the time measurement needed to determine distance. Frequently such techniques involve rather precise timing requirements; since the present invention also involves precise timing a single timing device may serve both purposes. The invention will be illustrated for simplicity in relation to the common pulse mode of operation altho it can also be used with the more sophisticated techniques mentioned above.

The invention will be more fully understood from the simple embodiment illustrated in the accompanying drawings, in which:

FIG. 1 illustrates the principal features of the beacon station on the object,

FIG. 2 the tracking station used to locate such object, and

FIG. 3 typical oscilloscope patterns during operation.

In FIG. 1 relating to the beacon station on the object being located a highly stable crystal oscillator 11, train of frequency dividers shown as 13 and 15, and pulser 17 provides a source of timing signals. An oscillator adapted to such a use and of suitable stability ($10^{-9}$) is discussed in An Ultra Precise Standard of Frequency, 13th Interim Report, No. 27480–L by Bell Telephone Laboratories under Contract DA36–039–sc–73078. A typical such oscillator operates at high radio frequency, about 5 mc./s., the fifth harmonic for a 1 mc./s. crystal. For use in the present system a repetition rate of around 125 p./s. is typical for a maximum unambiguous range of 1000 nautical miles. This can readily be obtained through frequency division by various suitable techniques discussed in Radiation Laboratory Series vol. 19, Waveforms, Chance et al., McGraw-Hill, 1949, chapters 15 and 16. Many variations are indicated:

A. each of input and output involving:
   (1) sine wave or
   (2) pulse wave

B. new frequency being produced:
   (1) by actual counting of cycles (usually as pulses) or
   (2) by using input to lock frequency of a fairly stable periodic wave either:
      (a) a tuned circuit for simple sinusoidal wave or
      (b) a relaxation circuit for complex wave.

For many of such forms of frequency divider the pulser 17 would not be essential. The pulse output is used to modulate transmitter 19 connected to antenna 21, operating at such a frequency as 5500 mc./s.

If the beacon is to be used for long term operation or requires occasional re-calibration to further increase accuracy it may include a transponder system 25 operating at such a frequency as 5550 mc. in the more conventional mode. This would include the usual duplexer 31, gated receiver 33, and delay 35, and is shown with a separate 5550 mc./s. transmitter 37 and antenna 39. To avoid response to its own transmission the transponder 25 includes a connection from the output of the delay 35 to the gating input of the receiver 33 to disable it during operation of transmitter 37. To this point the transponder 25 may be entirely conventional; but since it is used only occasionally it may be normally disabled and energized only at certain times under control of a further frequency divider 41.

In FIG. 2 relating to the locating station a timing system corresponding to FIG. 1 involves oscillator 61, dividers 63, 65, and pulser 67. The oscillators 11 and 61 ordinarily would be rather unstable during the warm-up period, would not be started simultaneously anyway, and would not start operation of the frequency divider chains 13–15 and 63–65 in synchronism. Therefore, to synchronize the outputs of pulsers 17 and 67 initially, or when error is discovered by occasional operation in the beacon mode as in the prior art, FIG. 2 includes a timing phase adjuster 69, shown between divider 65 and pulser 67. Depending on the particular type of frequency divider as discussed regarding FIG. 1, various arrangements might be found suitable to synchronize the pulser outputs. In the diagram this might be a phase shifter for a low frequency sine wave output or a delay device for a low repetition rate pulse output. A similar result might be obtained within the counting type frequency divider by adding or removing a group of pulses or in the frequency lock type divider by temporarily modifying the somewhat stable wave to alter the division ratio.

Transmission between beacon station and locating station occurs at the latter over highly directive antenna 71 and duplexer 113 connected to receiver 75 responsive to transmitter 19, another receiver designated responsor 117 responsive to transmitter 37, and a transmitter designated interrogator 119 to actuate transponder receiver 33. The output of receiver 75 is used (1) in angle tracker servomechanism system 81 to maintain antenna 71 properly pointed at the object in azimuth and elevation according to the manner common to radar skin or beacon angle tracking, and (2) in range tracker means shown as oscilloscope 83 having typical deflection and sweep synchronizing inputs. A single receiver as shown is sufficient for the range tracking to which the present invention is mainly related. Since the angle tracking is merely incidental to the present invention no details have been shown; however, angle tracking techniques requiring dual receivers could also be used. For a single receiver a very common angle tracking technique involves conical scanning, any fluctuation in receiver output being reduced to a minimum by operation of the angle tracker servomechanism, which therefore continuously points the axis of the conical scan at the beacon. The angle tracker is assumed to include the necessary means to compare receiver output at various points in the conical scan, such as reference generators or equivalent devices.

As shown the oscilloscope 83 displays the pulse from either receiver 75 applied as an upward deflection at $U_1$, or sometimes responsor 117 applied as an upward deflection at $U_2$, at a point along the range sweep dependent on the actual range. For worthwhile ranging accuracy the output of pulser 67 is also applied as a downward deflection at D thru a precision range calibrated delay 85. To assure a reading along the sweep its repetition rate is set at 62.5 p./s. and synchronized by the pulser 67 output applied at SW. An output of delay 85 may also be used in angle tracker 81 as a range gate to exclude noise, a technique common in radar systems. In extended use of such a system more sophisticated techniques, such as automatic range tracking, would be used.

In order to check the continued synchronization of pulsers 17 and 67 the interrogator 119 may be energized by the output of pulser 67 thru lower contacts of switch 97, whose upper contacts are shown disconnecting the output of receiver 75 from input $U_1$ of oscilloscope 83. If receiver 33 is energized only at certain times under control of divider 41, the tracking station should include a corresponding divider 91 and indicator 93 so that operator might use switch 97 only when it would be effective. In this figure reference numerals 91 and above relate to the interrogator responsor system.

In preparing for actual operation, after warm-up, the distance from the tracking station to the beacon (on the object to be tracked) before leaving its starting position may be set into the calibrated delay. Altho this distance is usually small, unless actually negligible this provides a very simple way to exclude it from later range calculations. This locates the downward deflection from the delay 85 substantially at the beginning and center of the sweep, but the upward deflection from receiver 75 at any random location as portrayed in FIG. 3A. Then the timing phase adjuster is set to move the upward deflection until the two are superposed, leaving only small residual deflections as in FIG. 3B. When synchronism of the system has actually been accomplished there should be no variation in this pattern.

The interrogator responsor operation may also be checked by operation of switch 97. The reading of indicator 93 should be noted when an actual responsor output appears, so that later interrogations may be made only when effective. The reading of delay 85 to superpose its downward deflection and the upward deflection from responsor 117 would represent double the range plus any inherent delays in the system; this reading also should be noted to correct for such inherent delays in later readings. More sophisticated means for automatic control of the actuation of the interrogator-responsor system and for avoiding the need to double the range setting are within the skill of the art and bear no essential relation to the present invention.

After adequate checking the beacon on the object to be tracked travels on its path. If no adjustment is made the pattern would again appear somewhat as in FIG. 3A with the spacing between upward and downward deflections representing the error in setting of the range calibrated delay; correction of delay 85 would move the downward deflection to superpose it on the upward deflection leaving substantially the same pattern as in FIG. 3B except for the range position of the residual deflections. Such a superposition of the two deflections provides a more precise range measurement than could be obtained by reading merely the position of the received signal deflection along the sweep trace. The setting of adjuster 69 may be corrected after each interrogator responsor operation or even continuously according to predicted setting if sufficiently stable; such techniques are common in radar tracking of actual range rather than range error as in the present system.

Many variations in equipment and operation will be apparent to those skilled in the art.

What is claimed is:

A radio position finding beacon system comprising relatively movable tracking and beacon stations, each having highly stable timing means mutually synchronized, said beacon station including a transmitter controlled by the timing means at said station to propagate energy having recognizable timing characteristics in the form of sharp energy pulses, said tracking station including also: a receiver for such energy, directional tracking means responsive to the output of said receiver to indicate the direction of said beacon station relative to said tracking station, means to identify the timing characteristics in the output of said receiver, means to compare said identified timing characteristics with the output of the timing means at said tracking station to determine the range between said stations by the one-way propagation delay, whereby both direction and distance of the beacon station relative to the tracking station are determined by transmission only from said beacon to said tracking stations, and further means at said beacon station to receive and retransmit other energy having recognizable timing characteristics, and at said tracking station to occasionally transmit to and receive from said station such energy and to compare the timing characteristics of such transmitted and received energy to determine the range between said stations by the round-trip propagation delay, whereby any range reading error due to said timing means may be corrected.

References Cited in the file of this patent
UNITED STATES PATENTS
3,045,234    Sandretto _____ July 17, 1962